(12) United States Patent
Kishibata et al.

(10) Patent No.: US 8,810,052 B2
(45) Date of Patent: Aug. 19, 2014

(54) CONTROL DEVICE FOR ROTARY ELECTRICAL MACHINE

(75) Inventors: Kazuyoshi Kishibata, Numazu (JP); Masakatsu Takahashi, Numazu (JP)

(73) Assignee: Kokusan Denki Co., Ltd, Numazu-Shi (JP)

( * ) Notice: Subject to any disclaimer, the term of this patent is extended or adjusted under 35 U.S.C. 154(b) by 0 days.

(21) Appl. No.: 13/884,854

(22) PCT Filed: Nov. 10, 2010

(86) PCT No.: PCT/JP2010/006602
§ 371 (c)(1),
(2), (4) Date: May 10, 2013

(87) PCT Pub. No.: WO2012/063287
PCT Pub. Date: May 18, 2012

(65) Prior Publication Data
US 2013/0234446 A1     Sep. 12, 2013

(51) Int. Cl.
| | |
|---|---|
| *F02N 11/00* | (2006.01) |
| *H02P 9/04* | (2006.01) |
| *F02N 11/08* | (2006.01) |
| *B60L 15/02* | (2006.01) |
| *G05B 19/00* | (2006.01) |
| *H02H 7/00* | (2006.01) |
| *B60L 11/08* | (2006.01) |

(52) U.S. Cl.
CPC ............... *F02N 11/08* (2013.01); *B60L 15/025* (2013.01); *G05B 19/00* (2013.01); *H02H 7/00* (2013.01); *B60L 11/08* (2013.01)
USPC ........... 290/38 R; 257/706; 318/709; 361/699

(58) Field of Classification Search
CPC ..................... H02M 7/003; H02M 2003/1552; H02M 5/458; H02M 7/217; H02P 2009/002; B60L 11/08; G01P 1/103
USPC ........... 290/38 R; 257/706; 318/709; 361/699
See application file for complete search history.

(56) References Cited

U.S. PATENT DOCUMENTS 3,790,874 A * 2/1974 Klimo ........................... 318/490
5,942,818 A * 8/1999 Satoh et al. ..................... 310/46

(Continued)

FOREIGN PATENT DOCUMENTS

| | | |
|---|---|---|
| JP | 2002-17098 A | 1/2002 |
| JP | 2003-184712 A | 7/2003 |
| JP | 2004-15936 A | 1/2004 |
| JP | 2008-29046 A | 2/2008 |

*Primary Examiner* — Pedro J Cuevas
(74) *Attorney, Agent, or Firm* — Pearne & Gordon LLP

(57) ABSTRACT

A control device for controlling a rotary electrical machine functioning as a motor and as a power generator, the device being provided with a power conversion circuit serving to function as an inverter for supplying a drive current from a battery to the rotary electrical machine and as a rectifier for rectifying the power generation output of the rotary electrical machine and supplying the output to the battery; and being provided with a controller for controlling the conversion circuit so that three-phase armature coils of the rotary electrical machine are short-circuited when the battery is disconnected from the conversion circuit and the DC output voltage of the conversion circuit becomes excessive, after which, when the DC output voltage of the conversion circuit decreases to a set low voltage, the short circuit of one phase of the armature coil is released and only two phases are short-circuited.

6 Claims, 6 Drawing Sheets

(56) References Cited

U.S. PATENT DOCUMENTS

| | | | |
|---|---|---|---|
| 6,465,973 B1 * | 10/2002 | Kato et al. | 318/400.32 |
| 7,812,443 B2 * | 10/2010 | Tokuyama et al. | 257/706 |
| 7,968,925 B2 * | 6/2011 | Tokuyama et al. | 257/299 |
| 7,978,471 B2 * | 7/2011 | Tokuyama et al. | 361/699 |
| 8,416,574 B2 * | 4/2013 | Tokuyama et al. | 361/699 |
| 8,497,654 B2 * | 7/2013 | Sakaguchi et al. | 318/709 |
| 2008/0251909 A1 * | 10/2008 | Tokuyama et al. | 257/706 |
| 2009/0231811 A1 * | 9/2009 | Tokuyama et al. | 361/699 |
| 2011/0069455 A1 * | 3/2011 | Tokuyama et al. | 361/702 |
| 2011/0228479 A1 * | 9/2011 | Tokuyama et al. | 361/699 |
| 2011/0291605 A1 * | 12/2011 | Sakaguchi et al. | 318/709 |
| 2013/0194853 A1 * | 8/2013 | Tokuyama et al. | 363/131 |

* cited by examiner

CONTROL DEVICE FOR ROTARY ELECTRICAL MACHINE

TECHNICAL FIELD

The present invention relates to a control device for controlling a rotary electrical machine provided with a rotor, the magnetic field of which is formed by a permanent magnet, and a stator having three-phase armature coils; the machine being made to operate as an AC power generator or a motor.

BACKGROUND ART

Motors for starting engines and engine-driven power generators for generating a battery-charging output have been used as rotary electrical machines attached to internal combustion engines installed in automobiles, ships, construction machinery, motors and power generators, and the like. In recent years, however, the installation of rotary electrical machines functioning as both a power generator and a motor in automobiles has been investigated in order to reduce installation space requirements, lower costs, and improve rotary electrical machine performance.

In order to operate such rotary electrical machines, a control device provided with a power conversion circuit disposed between a battery and the rotary electrical machine and with a controller for controlling the power conversion circuit is necessary, as disclosed, for example, in Patent Document 1. A three-phase full bridge circuit is typically used as the power conversion circuit. A three-phase full bridge power conversion circuit is provided with three legs having upper and lower arms provided with a switch element and a feedback diode connected in antiparallel to the switch element, the three legs being connected in parallel to one another. This type of power conversion circuit has a pair of DC terminals (direct current-side terminals) extending from the two ends of the full bridge circuit, and three-phase AC terminals (alternating current-side terminals) extending from the points where the upper arm and the lower arm of each of the three legs of the full bridge circuit connect. The pair of DC terminals is connected across the battery, and the three-phase AC terminals are connected to three-phase terminals of the armature coil of the rotary electrical machine, respectively. A smoothing capacitor is connected between the pair of DC terminals of the power conversion circuit.

The controller for controlling the switch elements of the power conversion circuit is provided with a microprocessor and a switch drive circuit for sending a drive signal to the switch elements of the power conversion circuit, and is configured so as to operate upon receiving a power source voltage from a control power source circuit for forming a constant DC voltage from the voltage across the DC terminals of the power conversion circuit. The controller controls the switch elements of the power conversion circuit so that, when the rotary electrical machine is made to operate as a motor for starting an internal combustion engine, the power conversion circuit is made to function as an inverter, and an armature current is supplied from a DC power source to the rotary electrical machine. In addition, when the rotary electrical machine is driven by the internal combustion engine and made to operate as an AC power generator, the controller performs control so that the power conversion circuit is made to function as a rectifier and a charging current is supplied from the armature coil to the DC power source, and the voltage across the battery is kept within a set range.

A suitable method of controlling the battery charging voltage is selected according to the configuration of the rotary electrical machine. For example, to control a rotary electrical machine in which the magnetic field of a rotor is formed by a permanent magnet (hereafter, "a permanent magnet type rotary electrical machine"), a method of repeating, when the terminal voltage of a battery exceeds a set value, an operation of simultaneously switching on the switching elements of the lower arms or the upper arms of the full bridge circuit constituting the power conversion circuit and short circuiting the three-phase armature coils and an operation of releasing the armature coil short circuit, thereby keeping the terminal voltage of the battery near a set value, is used as a method of controlling battery charging voltage.

If the rotor of the rotary electrical machine has a magnetic field coil, a method of adjusting the output voltage of the rotary electrical machine by controlling the electrical current supplied to the magnetic field coil is adopted as a method of controlling battery charging voltage.

In the control device for a rotary electrical machine configured as described above, there is the problem that if, when the rotary electrical machine is being rotatably driven by the internal combustion engine and is charging the battery, the wiring connecting the battery to the power conversion circuit is cut or the relay or other switch means connecting the battery to the power conversion circuit malfunctions, causing the battery to be disconnected from the power conversion circuit, the controller loses the ability to completely control power generation output, and an excessive voltage is generated between the DC terminals of the power conversion circuit, the excessive voltage destroying the component parts of circuits connected between the DC terminals of the power conversion circuit.

In order to prevent the problem described above, the control device disclosed in Patent Document 2 has been proposed for a rotary electrical machine in which a rotor is provided with a magnetic field coil. In this control device, a power conversion circuit is provided between a DC power source, such as a battery, and a rotary electrical machine, and, when the rotary electrical machine is made to operate as a power generator and charge a DC power source, the magnetic field current is controlled so that the voltage of the DC terminals of the power conversion circuit is kept at a set value, thereby keeping the voltage across the DC terminals of the power conversion circuit at a set value.

The control device disclosed in Patent Document 2 is provided with means for detecting that an excessive voltage has been generated when the DC output voltage of the power conversion circuit continuously exceeds a predetermined value for a set amount of time, and is configured to perform control so as to set the magnetic field current to zero when an excessive voltage is detected, and simultaneously turn on either the switch elements of the lower arms or the switch elements of the upper arms of the power conversion circuit, thereby short circuiting the three-phase armature coils and changing the rotary electrical machine output voltage to zero.

In accordance with the control device disclosed in Patent Document 2, because an operation of suppressing the output of the rotary electrical machine is performed when the wiring connecting the DC power source to the power conversion circuit is cut and an excessive voltage is generated between the DC terminals of the power conversion circuit, the destruction of circuits connected between the DC terminals of the power conversion circuit by excessive voltage when the DC power source is removed can be prevented.

PRIOR ART LITERATURE

Patent Literature

Patent Document 1: Japanese Laid-Open Patent Application 2003-184712

Patent Document 2: Japanese Laid-Open Patent Application 2004-015936

DISCLOSURE OF THE INVENTION

Problem to be Solved by the Invention

In the control device disclosed in Patent Document 2, because the magnetic field current is set to zero and the three-phase armature coils is short-circuited, thereby setting the output of the power generator to zero, when the DC power source is disconnected from the power conversion circuit and an excessive voltage is generated across the DC terminals of the power conversion circuit when the rotary electrical machine is being made to operate as a power generator, the voltage across the smoothing capacitor ultimately decreases, and the voltage across the DC terminals of the power conversion circuit decreases to a voltage lower than the minimum value of the voltage range necessary for the control power source circuit to generate a power source voltage to keep the controller in a state of operation. Because, in this state, the controller ceases to function and a drive signal can no longer be sent to the gates of the switch elements of the power conversion circuit, the switch elements, which had been short circuiting the armature coil, turn off. Because the magnetic field current is set to zero when an excessive voltage is detected in the control device disclosed in Patent Document 2, power generation output is kept at zero even if the rotary electrical machine is still rotating when the controller ceases to function. It is thus possible to prevent the destruction of component parts of circuits connected between the DC terminals of the power conversion circuit due to excessive voltage when the DC power source is disconnected from the power conversion circuit when the rotary electrical machine is operating as a power generator.

However, if the rotary electrical machine is a permanent magnet-type rotary electrical machine, the configuration disclosed in Patent Document 2 cannot be adopted unmodified for the following reasons.

Even in cases in which the magnetic field of the rotor is formed by a permanent magnet, when the DC power source is disconnected from the power conversion circuit when the rotary electrical machine is operating as a power generator, the power generation output of the rotary electrical machine will become zero when the three-phase armature coils short circuits, the voltage across the DC terminals of the power conversion circuit will become lower than the minimum value of the voltage range necessary to maintain the power source voltage of the controller, and the controller will cease to function. When the controller ceases to function, drive signals are no longer sent to the gates of the switch elements of the power conversion circuit, with the result that the three switch elements that had been short circuiting the three-phase armature coils simultaneous turn off, and the short circuit of the three-phase armature coils is instantaneously released. When the magnetic field of the rotor is formed by a permanent magnet, if the rotary electrical machine is still continuing its rotation when the short circuit of the armature coil is released, a voltage corresponding to the rotational speed of the rotary electrical machine is outputted therefrom. In addition, when the short circuit of the three-phase armature coils is instantaneously released, the short circuit current that had been flowing up that point in time is blocked, inducing an increased voltage in the three-phase armature coils. If the DC power source is disconnected from the power conversion circuit at this time, only the smoothing capacitor absorbs the energy outputted by the rotary electrical machine, with the result that the voltage across the DC terminals of the power conversion circuit abruptly increases. When the voltage across the DC terminals of the power conversion circuit increases, the output of the control power source circuit is restored, and the microprocessor forming part of the controller resumes operation. Here, the microprocessor of the controller first resets the CPU and initializes the various components, then begins an excessive voltage protection operation when the time to perform an excessive voltage protection operation task process arrives. For this reason, it may happen that the excessive voltage protection operation is unable to keep up with the sudden increase in voltage that occurs when the short circuit of the armature coil is released, and the voltage across the DC terminals of the power conversion circuit becomes excessive before the protection operation is begun and the armature coil is short-circuited, leading to the destruction of circuits connected across the DC terminals of the power conversion circuit.

When the DC power source is disconnected and an excessive voltage is generated, it is conceivable to perform control so that the internal combustion engine is stopped simultaneously with the short-circuiting of the armature coil. However, even if a control is performed so as to stop the internal combustion engine, a certain amount of time is necessary for the internal combustion engine to actually stop due to the inertia of the internal combustion engine and the rotary electrical machine connected to the internal combustion engine, with the result that it may not be possible to reliably prevent the destruction of the component part of circuits connected between the DC terminals of the power conversion circuit when the voltage induced in the armature coil suddenly increases.

An object of the present invention is to provide a control device for a rotary electrical machine, the device being capable, when the rotary electrical machine is being operated as a power generator and is charging a DC power source via a power conversion circuit, of reliably preventing damage to the component parts of a circuit connected between the DC terminals of the power conversion circuit by excessive voltage when the DC power source is disconnected from the power conversion circuit.

Means for Solving the Problem

The present invention is related to a control device for controlling a rotary electrical machine provided with a rotor, the magnetic field of which is formed by a permanent magnet, and a stator having three-phase armature coils; the machine being made to operate as an AC power generator or a motor.

The control device according to the present invention is provided with a power conversion circuit comprising a three-phase full bridge circuit in which individual arms are provided with a switch element and a feedback diode connected in antiparallel to the switch element, the power conversion circuit having a pair of DC terminals (direct current side terminals) connected across a DC power source and three-phase AC terminals (alternating current side terminals) connected to each of three phase armature coil terminals; a smoothing capacitor connected between the DC terminals of the power conversion circuit; and a controller for controlling the power conversion circuit. The controller is driven by a power source voltage which is a control DC voltage obtained from the voltage across the DC terminals of the power conversion circuit, and controls the switch elements of the power conversion circuit so that, when the rotary electrical machine is operated as a motor, the power conversion circuit is made to function as an inverter and an armature current is supplied from the DC power source to the rotary electrical machine; and, when the rotary electrical machine is operated as an AC power generator, the power conversion circuit is made to function as a rectifier and a charging current is supplied from the armature coil to the DC power source.

The controller of the present invention is configured so as to perform three-phase short circuit control, in which, when the value of the voltage across the DC terminals of the power conversion circuit is equal to or greater than a set excessive voltage benchmark value, the three switch elements of the upper arms or the three switch elements of the lower arms of the power conversion circuit are simultaneously switched on, thereby short-circuiting the three-phase armature coils; and two-phase short circuit control, in which, when the value of the voltage across the DC terminals of the power conversion circuit is less than the excessive voltage benchmark value and decreases to a low voltage benchmark value set to a value higher than the minimum value of the voltage range necessary to maintain the power source voltage of the controller, one of the three switch elements short-circuiting the three-phase armature coils is turned off and only a two armature phase coils is short-circuited.

In the configuration described above, when the DC power source is disconnected from the power conversion circuit and the voltage across the DC terminals of the power conversion circuit increases to the excessive voltage benchmark value while the rotary electrical machine is being operated as a power generator, the three-phase armature coils short circuit and the output of the rotary electrical machine becomes zero, thereby allowing the destruction of the component parts of a circuit connected between the DC terminals of the power conversion circuit by excessive voltage to be prevented.

When the output of the rotary electrical machine becomes zero, the voltage across the smoothing capacitor progressively decreases, with the result that the voltage across the DC terminals of the power conversion circuit progressively decreases. When the voltage across the DC terminals of the power conversion circuit decreases to the low voltage benchmark value, one of the switch elements that had been short-circuiting the three-phase armature coils is turned off, switching to a state in which only two armature phase coils are short-circuited, with the result that the armature coils generate a single-phase AC voltage. At this time, a half-wave rectified voltage of the single-phase AC voltage induced in the armature coil of one phase of the rotary electrical machine appears between the DC terminals of the power conversion circuit. Adopting a configuration in which only a half-wave rectified output of the induced voltage of one phase of the rotary electrical machine appears between the DC output terminals of the power conversion circuit, when the DC power source is disconnected as described above, allows voltage across the DC terminals to gradually increase, thereby enabling the subsequent performance of three-phase short circuit control when the voltage across the DC terminals increases to the excessive voltage benchmark value, and allowing the destruction of component parts of a circuit connected between the DC terminals of the power conversion circuit to be prevented. The repetition of the three-phase short circuit control and two-phase short circuit control described above allows the voltage across the DC terminals of the power conversion circuit to be kept at or above the minimum value of the voltage range necessary to maintain the power source voltage of the controller, ensuring the power source voltage of the controller while excessive voltage protection control is being performed and allowing the controller to be kept in an operable state. It is thereby possible to prevent the short circuit of the armature coil being released and an excessive voltage appearing across the DC terminals of the power conversion circuit when the DC power source is disconnected from the power conversion circuit, thus enabling reliable performance of the excessive voltage protection operation.

In the aspect described above, the timing, at which one of the three switch elements short-circuiting the three-phase armature coils is turned off when two-phase short circuit control is being performed, is preferably set so as to fall within a period in which a forward current is flowing through the feedback diode connected in antiparallel to the switch element to be turned off.

When the three-phase armature coils is short-circuited, if that switch element, out of the three switch elements short-circuiting the armature coil, through which a short circuit current having a polarity traveling from the rotary electrical machine in the direction of the power conversion circuit is turned off, and the short-circuiting operation of one phase is released, the short circuit current is blocked, creating the risk of an elevated voltage being induced in the armature coil and the voltage across the DC terminals of the power conversion circuit becoming excessive. In contrast, if the timing at which one of the three switch elements short-circuiting the three-phase armature coils is turned off when switching the armature coil short circuit control from three-phase short circuit control to two-phase short circuit control is set within the period in which a forward current is flowing through the feedback diode connected in antiparallel to the switch element to be turned off, as described above, the short circuit current is not blocked when releasing the short circuit of one phase, thus allowing the induction of an elevated voltage in the armature coil and the generation of an excessively great voltage across the DC terminals of the power conversion circuit to be prevented when switching short circuit control from three-phase short circuit control to two-phase short circuit control.

In the aspect described above, two-phase short circuit control is preferably performed by turning off the switch element connected in parallel to the feedback diode through which a forward current is flowing when the voltage across the DC terminals of the power conversion circuit decreases to the low voltage benchmark value.

The configuration described above also allows for one switch element to be turned off and the short circuit of one phase of the armature coil to be released without blocking the short circuit current, thereby making it possible to switch the armature coil short circuit control from three-phase short circuit control to two-phase short circuit control and secure a power source voltage for the controller without generating an excessive great voltage across the DC terminals of the power conversion circuit.

In the various aspects described above, it is preferable, for safety, to provide a control device for reducing the rotational speed of the rotary electrical machine or stopping the rotary electrical machine when the voltage across the DC terminals of the power conversion circuit is equal to or greater than the excessive voltage benchmark value when the rotary electrical machine is being operated as an AC power generator.

If the control device described above is provided, the rotational speed of the rotary electrical machine will progressively decrease when the DC power source is disconnected from the power conversion circuit. When the rotational speed of the rotary electrical machine progressively decreases when protective control in the form of two-phase short circuit control is in effect, it will ultimately be impossible to secure a power source of the control system, and protective control will be released. Because the timing at which protective control is released is not a monitored timing, protective control may be released at an unexpected timing when performing continuous protective control. In order to prevent protective control from being released at an unexpected timing and the voltage across the DC terminals from becoming excessive, the controller is preferably configured so as to end two-phase short circuit control when the rotational speed of the rotary electrical machine becomes equal to or less than a set safety speed. The safety speed is set to a rotational speed such that the unloaded induced voltage of the rotary electrical machine has a voltage value that will not damage equipment.

Effects of the Invention

The present invention is configured so that three-phase short circuit control, in which three-phase armature coils are short-circuited, is performed when the value of the voltage across the DC terminals of the power conversion circuit is equal to or greater than a set excessive voltage benchmark value; and short circuit control of the armature coils is switched to two-phase short circuit control, in which armature coils for only two phases are short-circuited, when the value of the voltage across the DC terminals of the power conversion circuit decreases to a low voltage benchmark value set lower than the excessive voltage benchmark value and equal to or greater than the minimum value of the voltage range necessary to maintain the power source voltage of the controller; thereby ensuring a power source voltage for the controller while an operation of protecting a circuit connected between the DC terminals of the power conversion circuit from excessive voltage is being performed, keeping the controller in an operable state. It is thus possible to prevent the controller from ceasing operation and an excessive voltage from being generated between the DC terminals of the power conversion circuit while the excessive voltage protection operation is being performed, allowing the excessive voltage protection operation to be reliably performed.

BEST MODE FOR CARRYING OUT THE INVENTION

Figure 1:
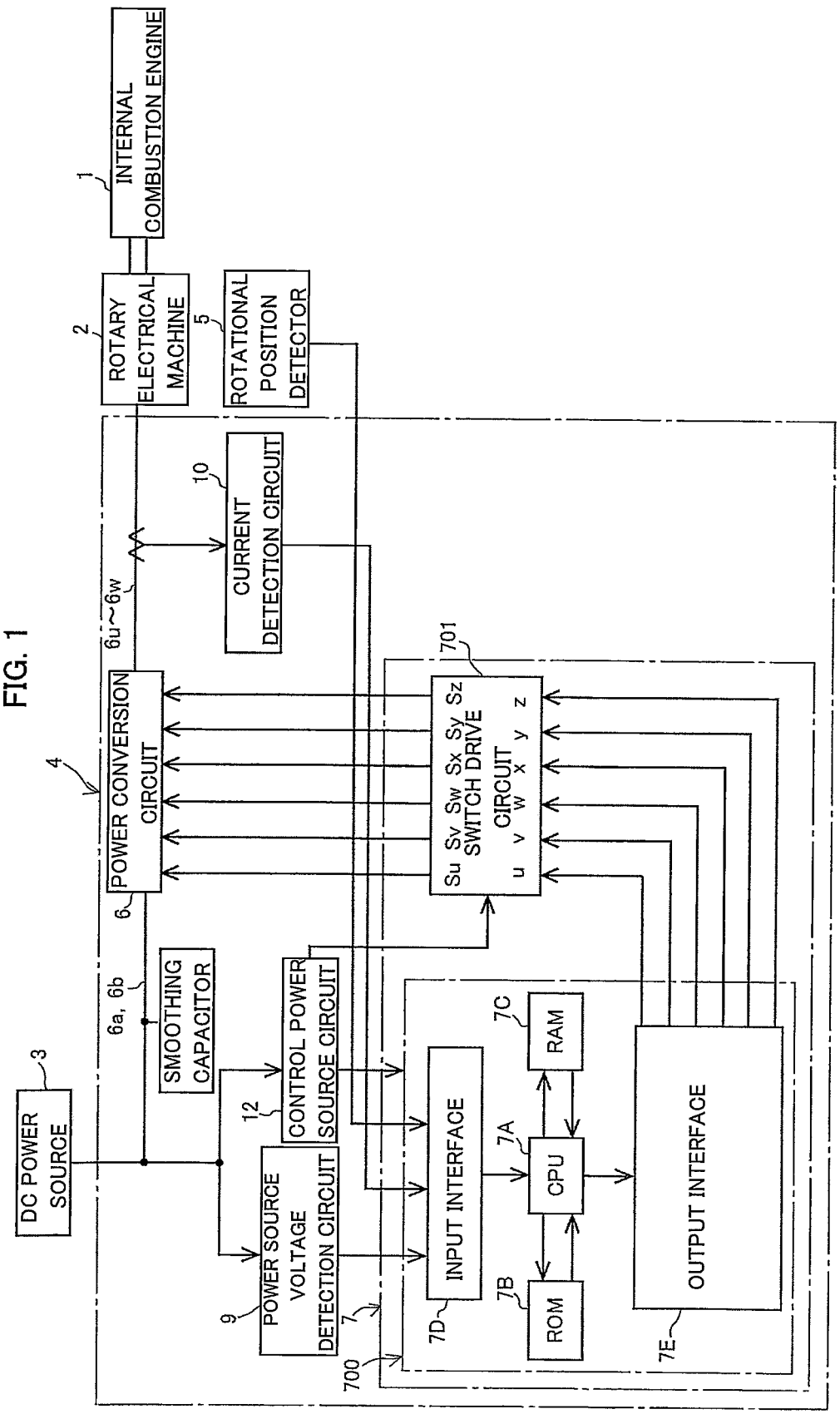
FIG. 1 is a block diagram showing the overall configuration of one embodiment of the control device for a rotary electrical machine according to the present invention.

FIG. 1 shows the overall configuration of one embodiment of the present invention, with a reference numeral 1 being an internal combustion engine; 2 being a permanent magnet rotary electrical machine having a rotor and a stator, the rotor being coupled to a crankshaft of the internal combustion engine 1; 3 being a DC power source; and 4 being a control device for controlling the rotary electrical machine 2.

Figure 4:
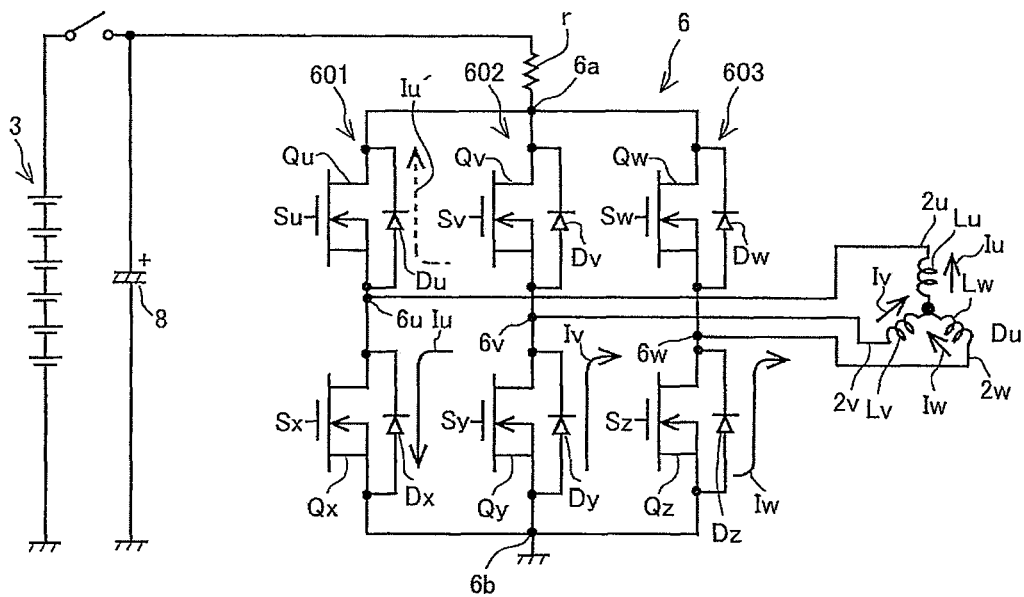
FIG. 4 is a circuit diagram of the power conversion circuit of the present embodiment, shown with a current that flows when three-phase armature coils are short-circuited.
Figure 5:
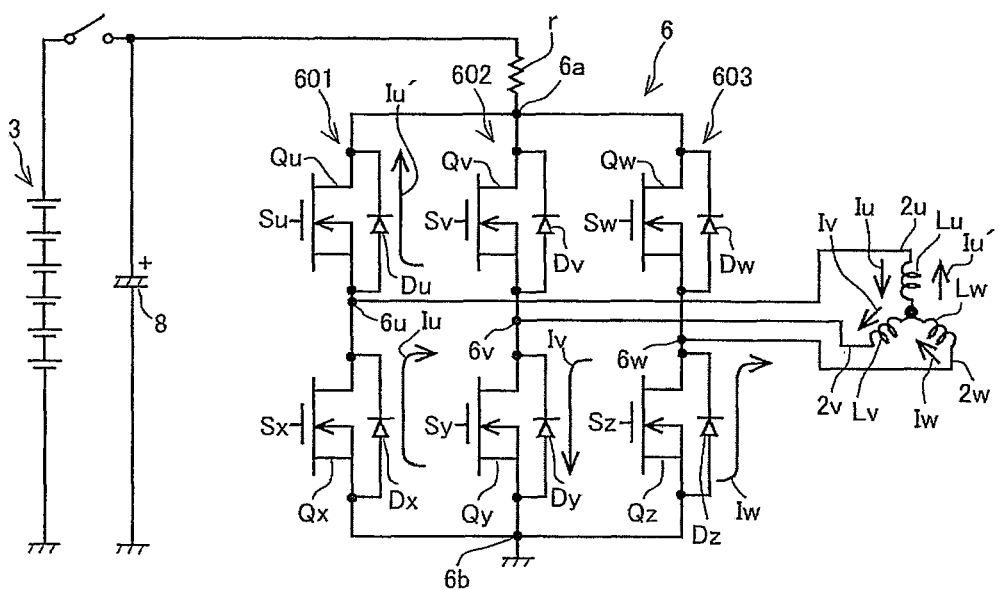
FIG. 5 is a circuit diagram of the circuit diagram of the present embodiment, shown with a current that flows when two armature phase coils are short-circuited.

The rotor of the rotary electrical machine 2 has a magnetic field formed by a permanent magnet, and the stator has three-phase armature coils Lu, Lv, and Lw (see FIGS. 4 and 5). The rotary electrical machine 2 operates as a motor for starting the internal combustion engine 1 upon receiving electrical power from the DC power source 3 via a power conversion circuit to be described hereafter, and operates as an AC power generator by the rotor being driven by the internal combustion engine 1.

The rotor (not illustrated) of the rotary electrical machine 2 comprises, for example, a cup-shaped rotor yoke and a permanent magnet attached to the inner circumference of a circumferential wall of the rotor yoke, and is attached to the internal combustion engine 1 via the coupling of a boss provided in the center of a lower wall of the rotor yoke to the crankshaft of the internal combustion engine 1.

The stator of the rotary electrical machine 2 is constituted by an armature core having a magnetic pole part facing a magnetic pole of the magnetic field of the rotor, and the three-phase armature coils Lu-Lw wound around the armature core. The stator is mounted to a stator attachment frame provided on a case or the like of the internal combustion engine, and the magnetic pole part of the armature core faces the magnetic pole of the rotor across a gap.

A rotational position detector 5 is provided in order to detect the rotational angular position of the rotor of the rotary electrical machine 1. The rotational position detector 5 is constituted by, for example, three Hall-effect ICs disposed at each of three detection positions set for each of the three-phase armature coils. In this instance, the rotational position detector 5 outputs a signal having a square waveform in which the level changes from low level to high level or from high level to low level whenever the polarity of the magnetic poles of the rotor being detected by the Hall-effect ICs changes to each of the three-phase armature coils.

The DC power source 3 is constituted by a power source serving to accumulate electrical energy, and an energy storage device such as a battery or a capacitor. In the present embodiment, the energy storage device constituting the DC power source 3 is a battery.

The control device 4 is provided with a power conversion circuit 6 provided between the rotary electrical machine 2 and the DC power source 3, and a controller 7 for controlling the power conversion circuit 6.

Figure 2:
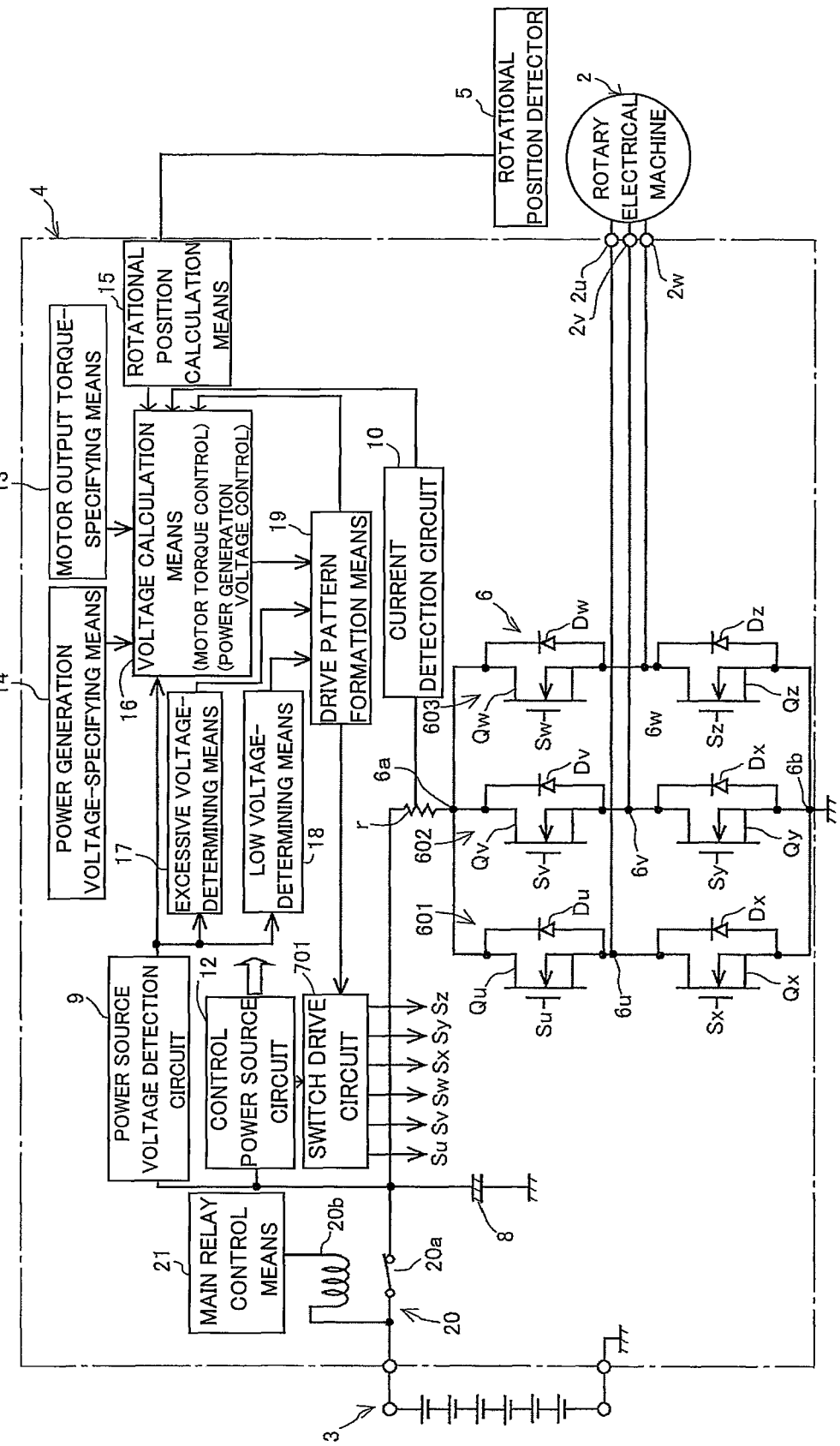
FIG. 2 is an illustration of various function-performing means constituted within a controller by a microprocessor in the control device of the present embodiment, along with the configuration of a power conversion circuit used in the present embodiment.

As shown in FIGS. 2, 4, and 5, the power conversion circuit 6 is constituted by a three-phase full bridge circuit provided with three legs 601-603 having upper and lower arms connected in series, each arm comprising a switch element and a feedback diode connected in antiparallel to the switch element, the three legs being connected in parallel.

In the example shown in the drawings, Qu, Qv, and Qw indicate the switch elements for the upper arms of the legs 601, 602, and 603, and Du, Dv, and Dw indicate the feedback diodes connected in antiparallel to the switch elements Qu, Qv, and Qw of the upper arms. Likewise, Qx, Qv, and Qz indicate the switch elements for the lower arms of the legs 601, 602, and 603, and Dx, Dy, and Dz indicate the feedback diodes connected in antiparallel to the switch elements Qx, Qv, and Qz of the lower arms.

The power conversion circuit 6 has a pair of DC terminals 6a, 6b extending from the two ends of the full bridge circuit, and three AC phase terminals 6u, 6v, and 6w extending from the points where the upper and lower arms of each of the three legs 601-603 of the full bridge circuit connect. The pair of DC terminals 6a, 6b of the power conversion circuit 6 are connected to the two ends of the DC power source 3, and the three AC phase terminals 6u, 6v, 6w are connected to three phase terminals 2u, 2v, 2w, respectively, of the armature coil of the rotary electrical machine 2. The DC terminals 6a, 6b are the positive and negative terminals, respectively, and the DC terminals 6a, 6b are connected to a positive terminal and a negative terminal, respectively, of the DC power source 3. In the example shown in the drawing, the negative terminal 6b is grounded. A smoothing capacitor 8 is connected between the pair of DC terminals 6a, 6b of the power conversion circuit 6. In FIGS. 2, 4, and 5, r is a current detection means inserted between the positive DC terminal 6a and the ungrounded terminal of the smoothing capacitor 8 in order to detect current flowing through the power conversion circuit 6. In the present embodiment, the current detection means is constituted by a shunt resistor.

The switch elements of the power conversion circuit 6 are constituted by semiconductor switch elements such as MOSFETs or IGBTs, and drive signals Su, Sv, Sw and Sx, Sy, Sz are sent from a switch drive circuit 701 provided in the controller 7 to gates of the switch elements Qu, Qv, Qw of the upper arms and the switch elements Qx, Qy, Qz of the lower arms, respectively. The switch elements of the arms of the power conversion circuit 6 transition from an OFF state to an ON state upon receiving a drive signal, remaining in the ON state as long as the drive signal is being received, and transitioning to the OFF state when the drive signal is no longer received.

When the rotary electrical machine 2 is operated as a motor, the timing at which the drive signals are sent to the switch elements Qu, Qv, Qw and Qx, Qy, Qz is controlled so as to channel, from the DC power source 3, a drive current switching between the three-phase armature coils Lu-Lw of the rotary electrical machine 2 in a predetermined order in order to cause the power conversion circuit 6 to function as an inverter and rotate the rotary electrical machine 2 in a predetermined direction. In addition, PWM control of the drive current being channeled through the armature coils of the rotary electrical machine is performed so that the switch elements of the upper arms or the switch elements of the lower arms of the power conversion circuit switch ON and OFF according to a predetermined duty cycle, thereby outputting a desired torque from the rotary electrical machine.

When the rotary electrical machine 2 is operated as a power generator, the full-bridge-connected feedback diodes Du-Dw and Dx-Dz of the power conversion circuit 6 function as full-wave rectifiers, converting the AC output generated by the armature coils of the rotary electrical machine 2 to DC output, and supplying the DC output to the DC power source 3 in order to charge the DC power source (in the present embodiment, a battery) 3.

The controller 7 is provided with a microprocessor 700 having a central processing unit (CPU) 7A, nonvolatile memory (ROM) 7B, volatile memory (RAM) 7C, an input interface 7D, an output interface 7E, and the like, and the switch drive circuit 701. A position detection signal acquired from the rotational position detector 5, an output from a power source voltage detection circuit 9 for detecting the voltage across the DC terminals 6a, 6b of the power conversion circuit 6, and an output from a current detection circuit 10 for detecting the drive current sent from the power conversion circuit 6 to the rotary electrical machine 2 are inputted into the CPU 7A of the controller 7 via the input interface 7D.

The output interface 7E of the microprocessor 700 forming a constituent part of the controller 7 has output terminals corresponding to the switch elements Qu, Qv, Qw and Qx, Qy, Qz of the power conversion circuit 6, and ON command signals u, v, w and x, y, z commanding the switch elements Qu, Qv, Qw and Qx, Qy, Qz, respectively, to be switched ON are outputted from the output terminals corresponding to the switch elements Qu, Qv, Qw and Qx, Qy, Qz at a predetermined timing. The switch drive circuit 701 has input terminals and output terminals corresponding to the switch elements Qu, Qv, Qw and Qx, Qy, Qz, respectively, and the ON command signals u, v, w and x, y, z outputted from the output terminals of the output interface 7E are inputted into the corresponding input terminals of the switch drive circuit 701.

The switch drive circuit 701 is provided with an amplifier for amplifying and outputting the ON command signals inputted into the input terminals from the output terminals, and, when ON command signals corresponding to the switch elements Qu, Qv, Qw and Qx, Qy, Qz, respectively, are outputted from the output interface 7E of the microprocessor 700, the ON command signals are amplified, and the amplified signals are supplied to the gates of the switch elements Qu, Qv, Qw and Qx, Qy, Qz of the power conversion circuit 6 as drive signals (supplied to the gates of each of the switch elements in order to turn the switch elements ON) Su, Sv, Sw and Sx, Sy, Sz.

When the rotary electrical machine 2 is operated as a motor, PWM control of the drive current supplied from the DC power source 3 to the rotary electrical machine 2 is performed in order to control the output torque thereof. To this end, out of the ON command signals outputted by the output interface 7E, the waveforms of the ON command signals corresponding to the switch elements of the lower arms or the ON command signals corresponding to the switch elements of the upper arms are modified so as to be interrupted according to a predetermined duty cycle, and the modified ON command signals are amplified and sent as drive signals to the gates of predetermined switch elements of the power conversion circuit 6. The switch elements of the lower arms or the switch elements of the upper arms of the power conversion circuit 6 are thereby turned ON and OFF according to a predetermined duty cycle, and PWM control of the drive current supplied to the rotary electrical machine 2 is performed.

A control power source circuit 12 for generating a constant DC voltage using the voltage across the DC terminals 6a, 6b of the power conversion circuit 6 as an input is provided, power source voltage being sent from the control power source circuit 12 to the controller 7. The control power source circuit 12 shown in the drawings outputs a power source voltage (e.g., 5 V) for driving the microprocessor 700, and a power source voltage (e.g., 10 V) for driving the switch drive circuit 701. In this case, the voltage across the DC terminals of the power conversion circuit must be equal to or greater than 10 V in order to keep the controller 7 in an operable state.

The microprocessor forming a constituent part of the controller 7 constitutes means for executing a predetermined program in order to perform various functions necessary to control the rotary electrical machine 2. In FIG. 2, an example of a function-performing means constituted by the microprocessor of the controller 7 is shown along with a sample configuration for the power conversion circuit 6.

Parts in FIG. 2 comparable to those shown in FIG. 1 are marked with the same symbols as in FIG. 1. In the example shown in FIG. 2, the microprocessor 700 (see FIG. 1) executes predetermined programs in order to act as a motor output torque-specifying means 13, a power generation voltage-specifying means 14, a rotational position calculation means 15, a vector calculation means 16, an excessive voltage-determining means 17, a low voltage-determining means 18, and a drive pattern formation means 19.

The motor output torque-specifying means 13 is a means for specifying an output torque value when the rotary electrical machine 2 is being operated as a motor. When the internal combustion engine is started, the motor output torque-specifying means 13 loads the specified value for the torque to be outputted by the rotary electrical machine 2 from the ROM and sends the value to the vector calculation means 16.

The power generation voltage-specifying means 14 is a means for specifying a maximum value and a minimum value for the voltage outputted by the rotary electrical machine 2 when the rotary electrical machine 2 is operated as a power generator and the battery is charged. After the process of starting the internal combustion engine is complete, the power generation voltage-specifying means 14 loads the specified power generation voltage value from the ROM and sends the value to the vector calculation means 16 when the rotary electrical machine is operated as a power generator.

The rotational position calculation means 15 constitutes means for calculating the rotational position (electrical angle) of the rotor of the rotary electrical machine, using the three-phase position detection signal outputted by the rotational position detector 5 provided in the rotary electrical machine 2.

The excessive voltage-determining means 17 constitutes means for comparing the voltage detected by the power source voltage detection circuit 9 and a preset excessive voltage benchmark value stored in a ROM 7B and determining whether the power source voltage detected by the power source voltage detection circuit 9 is equal to or greater than the excessive voltage benchmark value. The low voltage-determining means 18 is a means for determining whether the voltage detected by the power source voltage detection circuit 9 has decreased to a low voltage benchmark value.

The excessive voltage benchmark value is set to a value that is greater than the maximum value of the permissible range for the battery terminal voltage, and less than a voltage that will destroy component parts of a circuit connected between the DC terminals of the power conversion circuit 6.

The low voltage benchmark value is set so as to be lower than the excessive voltage benchmark value and greater than the minimum value of the voltage range necessary to maintain the power source voltage of the controller 7. If the voltage rating of the battery is 12 V, the excessive voltage benchmark value is set, for example, to 20 V, and the low voltage benchmark value is set, for example, to 10 V (the minimum voltage value necessary to operate the switch drive circuit 701).

Figure 3:
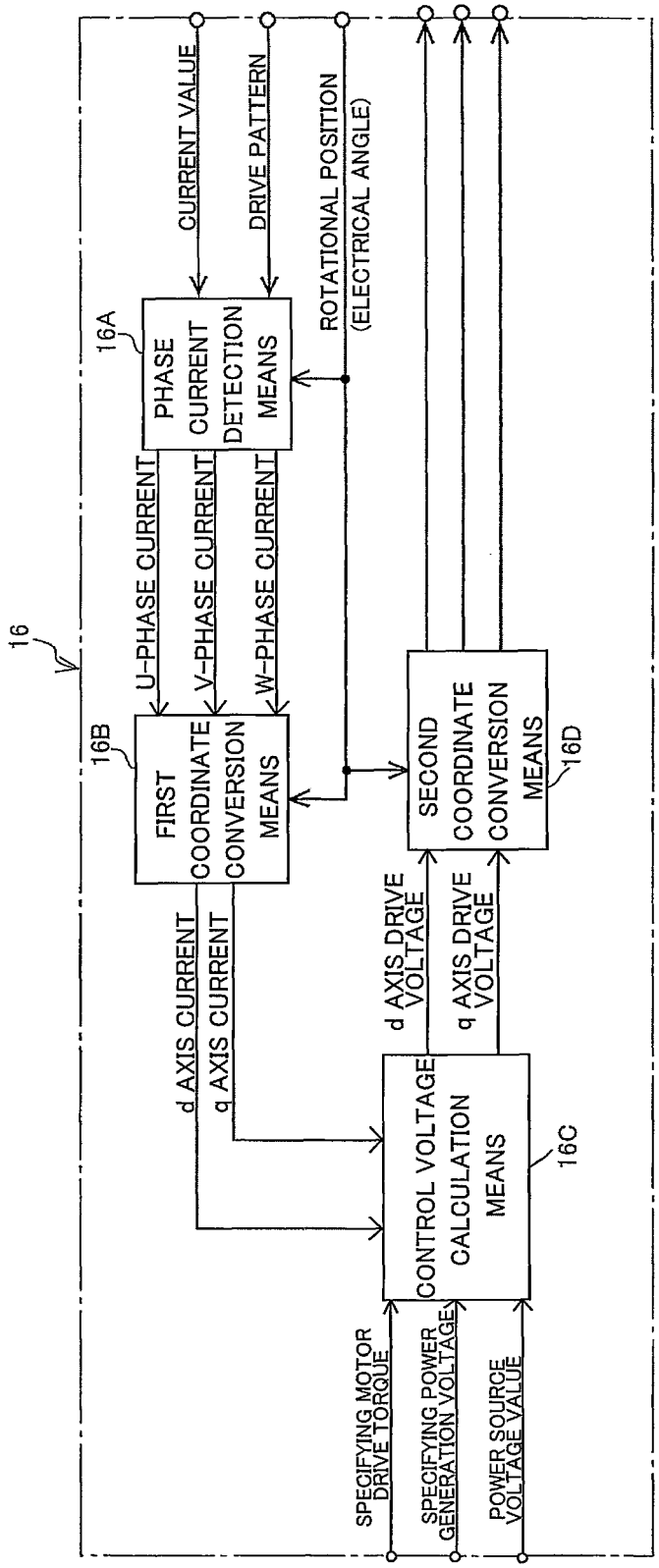
FIG. 3 is a block diagram showing an example of the configuration of a vector calculation means used in the present embodiment.

The vector calculation means 16 is provided in order to perform vector control of the rotary electrical machine, and is constituted by a phase current detection means 16A, a first coordinate conversion means 16B, a control voltage calculation means 16C, and a second coordinate conversion means 16D, as shown in FIG. 3.

In FIG. 3, the phase current detection means 16A calculates current magnitude and phase for three phases U, V, W in a rest coordinate system set in the stator on the basis of the current value detected by the current detection circuit 10, a drive pattern formed by the drive pattern formation means 19, and the rotational position (electrical angle) of the magnetic field of the rotor of the rotary electrical machine 2 calculated by the rotational position calculation means 15.

Using the rotational position (electrical angle) of the magnetic field of the rotor of the rotary electrical machine calculated by the rotational position calculation means 15, the first coordinate conversion means 16B performs a calculation of converting the rest coordinate system to a rotational coordinate system in which the axis passing through the center of the permanent magnets and the center of the rotor is the d axis and an axis the phase of which is shifted 90° in terms of electrical angle from the d axis is the q axis, and converting the current for each of the phases in the rest coordinate system detected by the phase current detection means 16A to a d axis-direction current component and a q axis-direction current component.

When the rotary electrical machine is driven as a motor and the internal combustion engine is started, the control voltage calculation means 16C calculates the d axis drive voltage and the q axis drive voltage necessary to generate the specified torque according to the specified motor output torque value received from the motor output torque-specifying means 13.

When the rotary electrical machine is driven by the internal combustion engine, thereby operating as a power generator and charging the battery of the DC power source 3, the control voltage calculation means 16C outputs the d axis drive voltage and q axis drive voltage necessary to perform control for making the power source voltage (voltage across the DC terminals) equal to the specified power generation voltage on the basis of the deviation between the specified power generation voltage value received from the power generation voltage-specifying means 14 and the power source voltage detected by the power source voltage detection circuit 9.

The control voltage calculation means 16C of the present embodiment performs feedback control of the d axis current component according to the power source voltage detected by the power source voltage detection circuit so that the d axis current is shifted to a magnetizing direction when the power source voltage (voltage across the DC power source 3) detected by the power source voltage detection circuit 9 is less than a set value constituting the lower limit of the permissible range of the voltage across the DC power source 3 (i.e., when insufficient power is being generated), and the d axis current is shifted in a de-magnetizing direction when the detected power source voltage exceeds a set value constituting the upper limit of the permissible range (i.e., when excessive power is being generated). In vector control, the d axis current component is equivalent to a magnetic field control current. If the DC power source 3 is a battery having a voltage rating of 12 V, the set value constituting the upper limit of the permissible range of the voltage across the DC power source 3 is set, for example, to 14 V.

The second coordinate conversion means 16D converts the d axis drive voltage and q axis drive voltage calculated by the control voltage calculation means 16C to drive voltages for each of the phases U, V, W of the rest coordinate system according to the rotational position (electrical angle) of the magnetic field of the rotor calculated by the rotational position calculation means 15.

The U-phase drive voltage, V-phase drive voltage, and W-phase drive voltage calculated by the second coordinate conversion means 16D are sent to the drive pattern formation means 19. The drive pattern formation means 19 calculates the PWM duty for the legs of each of the phases U, V, W on the basis of the U-phase drive voltage, V-phase drive voltage, and W-phase drive voltage received from the second coordinate conversion means 16D, and sends an ON command signal commanding a predetermined switch element of the power conversion circuit 6 to be turned ON to the switch drive circuit 701 according to the calculated PWM duty.

The drive pattern formation means 19 shown in FIG. 2 determines a switch element drive pattern for performing a control operation such that if, while the rotary electrical machine is being operated as a power generator, the DC power source 3 becomes disconnected from the power conversion circuit 6 for some reason and the voltage detected by the power source voltage detection circuit 9 is equal to or greater than the excessive voltage benchmark value, three-phase short circuit control, in which either all the switch elements of the upper arms of the power conversion circuit are simultaneously turned ON or all the switch elements of the lower arms are simultaneously turned ON and the three-phase armature coils are short-circuited, is performed; then, when the smoothing capacitor 8 discharges electricity and the voltage detected by the power source voltage detection circuit 9 decreases to a low voltage benchmark value set lower than the excessive voltage benchmark value and equal to or greater than the minimum value of the voltage range necessary to maintain the power source voltage of the controller 7, short circuit control, in which one of the three switch elements short-circuiting the three-phase armature coils is switched OFF and the armature coils are short-circuited, is switched to two-phase short circuit control, in which only two armature phase coils are short-circuited. The drive pattern formation means 19 then outputs ON command signals to the switch drive circuit 701 according to the determined drive pattern.

In FIG. 2, a reference numeral 20 is a main relay having a normally open contact 20a inserted between a positive terminal DC 6a and a positive electrode terminal of the DC power source 3, and an excitation coil 20b; 21 is a main relay control means for controlling the main relay 20. The main relay control means 21 is a means for performing, for example, control so that the excitation coil 20b is excited and the contact 20a is turned ON when a key switch not shown in the drawings is turned ON, and the excitation of the excitation coil 20b is released and the contact 20a is turned OFF when the key switch is turned OFF; and control so that the excitation of the excitation coil 20b is released and the contact 20a is turned OFF when an excessive current is detected by the current detection circuit 10. In FIG. 2, the relay 20 is in an excited state, and the contact 20a is closed.

The operation of the control device according to the present embodiment will be described hereafter. When the DC power source 3 is correctly connected to the power conversion circuit 6, the controller 7 used in the present embodiment performs motor drive control, in which the switch elements of the power conversion circuit 6 are controlled in order to operate the rotary electrical machine 2 as a motor, and charging control for keeping the voltage across the DC power source within a set range when the rotary electrical machine 2 is operated as a AC power generator and charges the DC power source 3 via the power conversion circuit 6 using the output from the rotary electrical machine 2; and excessive voltage protection control for protecting circuits connected between the DC terminals of the power conversion circuit 6 from excessive voltage when the DC power source 3 is disconnected from the power conversion circuit 6 and an excessive voltage is generated between the between the DC terminals 6a, 6b of the power conversion circuit 6 when the rotary electrical machine is being operated as a power generator. Motor drive control, battery charging control, and excessive voltage protection control are performed as described hereafter.

[Motor drive control] The microprocessor 700 of the controller 7 performs motor drive control when the internal combustion engine 1 is started. In this control, the d axis current and q axis current are calculated from the specified torque and the rotational speed, and the d axis drive voltage and q axis drive voltage are calculated so as to match the currents. Next, the drive voltages are converted by the second coordinate conversion means according to the rotational position to find specified values for the drive voltages for each of the phases U, V, W, and the phases U, V, W are PWM-driven according to the specified values. The method used to control the power control circuit when the rotary electrical machine 2 is operated as a motor is the vector control method used to control a brushless DC motor.

[Battery charging control] In battery charging control, the microprocessor 700 shifts the d axis current in a magnetizing direction when the power generation voltage is insufficient and shifts the d axis current in a de-magnetizing direction when the power generation voltage is excessive so that the voltage detected by the power source voltage detection circuit 9 matches the set charging voltage, and performs feedback control of the power generation voltage according to the detected output of the power source voltage detection circuit.

[Excessive voltage protection control] If, with the rotary electrical machine 2 being operated as a power generator, the wiring connecting the DC power source and the power conversion circuit is severed, or the relay 20 malfunctions and the contact 20a opens, disconnecting the DC power source 3 from the power conversion circuit 6, the controller 7 becomes incapable of completely controlling the rotary electrical machine, the output voltage thereof increases, and the voltage across the DC terminals 6a, 6b of the power conversion circuit 6 becomes excessive. In order to protect circuits connected between the DC terminals 6a, 6b of the power conversion circuit from the excessive voltage described above, excessive voltage protection control must be performed.

In conventional control devices for rotary electrical machines, as discussed above, if the DC power source 3 becomes disconnected and an excessive voltage is generated between the DC terminals of the power conversion circuit 6 when the rotary electrical machine is being operated as a power generator, all of the three-phase armature coils of the rotary electrical machine are short-circuited, thereby setting the output voltage of the armature coils to zero and protected circuits connected between the DC terminals.

Figure 7:
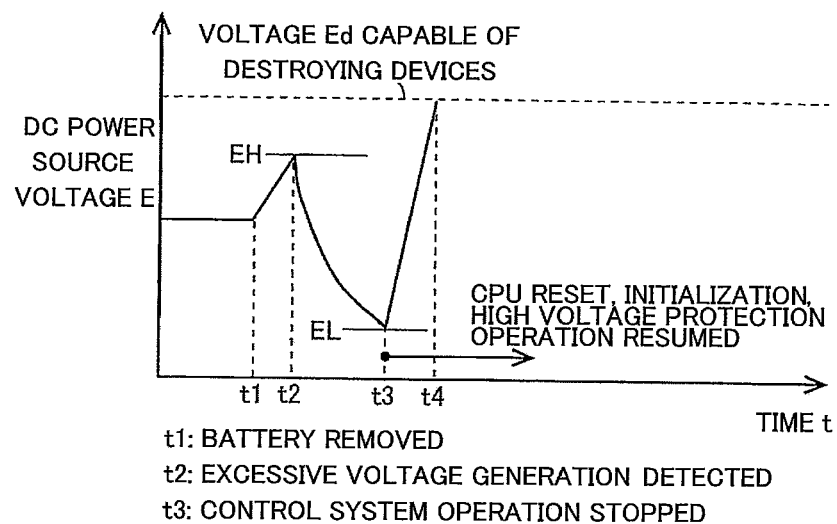
FIG. 7 is a graph schematically showing an example of changes in DC power source voltage in a control device that is a target of the present invention when a battery is removed.

FIG. 7 shows changes demonstrated by the voltage across the DC terminals of the power conversion circuit when an excessive voltage protection operation is performed in a conventional control device. The horizontal axis of FIG. 7 shows time t, and the vertical axis shows the voltage E between the DC terminals of the power conversion circuit (DC power source voltage). When the battery is removed at time t1 shown in FIG. 7 while the rotary electrical machine is being operated as a power generator, the output of the rotary electrical machine stops being absorbed by the battery, with the result that the output of the rotary electrical machine can no longer be controlled, and the DC power source voltage E rises. When the DC power source voltage E reaches an excessive voltage benchmark value EH at time t2, drive signals are simultaneously sent to the switch elements of all of the lower arms or the switch elements of all of the upper arms of the power conversion circuit, and the output of the rotary electrical machine is set to zero. While the output of the rotary electrical machine is set to zero, the smoothing capacitor connected between the DC terminals of the power conversion circuit discharges electricity, and the DC power source voltage E decreases as discharging continues.

When, at time t3, the DC power source voltage E becomes lower than a minimum value EL and the output voltage of the control power source circuit 12 falls below the lower limit of the voltage range at which the microprocessor of the controller 7 can be operated, the controller 7 ceases operation, and the short circuit of the armature coil of the rotary electrical machine 2 is released. This causes the output voltage of the rotary electrical machine to begin to rise, and the voltage across the DC terminals of the power conversion circuit progressively increases. When the short circuit of the armature coil is released, an elevated voltage is induced in the armature coil, causing an abrupt rise in the voltage across the DC terminals. When the voltage across the DC terminals rises, the power source voltage of the microprocessor is restored. After the power source voltage of the microprocessor is restored, the microprocessor first resets the CPU, then initializes the various parts, and begins excessive voltage protection control if the DC power source voltage is higher than the excessive voltage benchmark value EH. However, a lengthy period of time is required for the excessive voltage protection operation to be resumed after the microprocessor ceases operation at time t3, during which period the voltage across the DC terminals may exceed a voltage Ed capable of destroying devices at time t4.

In a conventional control device, as described above, the power source voltage of the microprocessor is temporarily lost when the DC power source 3 is removed from between the DC terminals of the power conversion circuit 6 and excessive voltage protection control is performed, with the result that a lengthy period of time is required for the excessive voltage protection operation to resume once the output voltage of the rotary electrical machine begins to rise again, during which period there is a risk of the voltage across the DC terminals of the power conversion circuit rising to a voltage capable of destroying devices.

In the present invention, in order to prevent the occurrence of the problem described above, when it is detected that the voltage across the DC terminals 6a, 6b has become equal to or greater than the excessive voltage benchmark value, three-phase short circuit control, in which the three-phase armature coils are short-circuited, is first performed, after which the short circuit of the armature coil for one phase is released before the voltage across the DC terminals 6a, 6b falls below the minimum value of the voltage range necessary to keep the microprocessor in an operable state, and the short circuit control of the armature coils is switched to two-phase short circuit control, in which only two armature phase coils are short-circuited.

When the DC power source 3 is disconnected from between the DC terminals of the power conversion circuit, and the voltage across the DC terminals of the power conversion circuit 6 reaches an excessive voltage benchmark value greater than a set value constituting the upper limit of the permissible range of the voltage across the DC power source 3 and lower than a voltage value capable of destroying devices, the microprocessor of the controller 7 used in the present embodiment begins processing for performing excessive voltage protection control to protect the components of circuits connected between the DC terminals of the power conversion circuit 6 from excessive voltage. If the DC power source 3 is a battery having a voltage rating of 12 V, the excessive voltage benchmark value is set, for example, to 20V.

Once this processing has begun, three-phase short circuit control, in which the three switch elements of the upper arms or the three switch elements of the lower arms of the power conversion circuit 6, thereby short-circuiting the three-phase armature coils of the rotary electrical machine 2, is first performed. Next, when the value of the between the DC terminals of the power conversion circuit 6 decreases to a low voltage benchmark value set lower than the excessive voltage benchmark value and equal to or greater than the minimum value of the voltage range necessary to maintain the power source voltage of the controller 7, one of the three switch elements short-circuiting the three-phase armature coils of the rotary electrical machine is turned OFF, and the short circuit control of the armature coils is switched to two-phase short circuit control, in which only two armature phase coils are short-circuited. The power source voltage necessary to operate the microprocessor 700 of the controller 7 is, for example, 5 V, and the power source voltage necessary to operate the switch drive circuit 701 is, for example, 10 V. In this case, the low voltage benchmark value is set to at least 10 V.

In the configuration described above, when the DC power source 3 is disconnected from the power conversion circuit 6 and the voltage across the DC terminals of the power conversion circuit increases to the excessive voltage benchmark value while the rotary electrical machine 2 is being operated as a power generator, the three-phase armature coils Lu-Lw short circuit and the output of the rotary electrical machine becomes zero, thereby allowing the destruction of the component parts of a circuit connected between the DC terminals of the power conversion circuit by excessive voltage to be prevented.

When control as described above is performed, all of the three-phase armature coils first short-circuit, and the output of the rotary electrical machine is set to zero, with the result that the voltage across the smoothing capacitor progressively decreases, and the voltage across the DC terminals of the power conversion circuit 6 progressively decreases. When the voltage across the DC terminals of the power conversion circuit decreases to the low voltage benchmark value, one of the switch elements that had been short-circuiting the three-phase armature coils is turned off, switching to a state in which only two armature phase coils are short-circuited, with the result that the armature coils generate a single-phase AC voltage. At this time, a voltage with a waveform yielded by half-wave rectifying the single-phase AC voltage outputted by the rotary electrical machine appears between the between the DC terminals of the power conversion circuit 6. Adopting a configuration in which only a half-wave rectified output of the AC voltage of one phase of the rotary electrical machine appears between the DC output terminals of the power conversion circuit when the DC power source 3 is disconnected from the power conversion circuit 6 as described above allows voltage increases between the DC terminals to be mitigated, thereby enabling the subsequent performance of three-phase short circuit control when the voltage across the DC terminals increases to the excessive voltage benchmark value, and allowing the destruction of component parts of a circuit connected between the DC terminals of the power conversion circuit to be prevented.

The repetition of the three-phase short circuit control and two-phase short circuit control described above allows the voltage across the DC terminals of the power conversion circuit to be kept at or above the minimum value of the voltage range necessary to maintain the power source voltage of the controller, thereby ensuring the power source voltage of the controller while excessive voltage protection control is being performed and allowing the microprocessor 700 to be kept in an operable state, as well as allowing the switch drive circuit 701 to be kept in an operable state. It is thereby possible to prevent the short circuit of the armature coil being released and an excessive voltage appearing between the DC terminals of the power conversion circuit when the DC power source is disconnected from the power conversion circuit, thus enabling reliable performance of the excessive voltage protection operation.

In excessive voltage protection control, if the timing at which one of the three switch elements short-circuiting the three-phase armature coils is turned OFF in order to switch the armature coil short circuit control from three-phase short circuit control to two-phase short circuit control is set within the period in which a short circuit current is flowing through the switch element to be turned OFF, the short circuit current for one phase is cut off when one of the switch elements is turned OFF, inducing an elevated voltage in the armature coils and leading to the risk of an excessive voltage being generated between the DC terminals of the power conversion circuit.

FIG. 4 illustrates a process of simultaneously turning ON the switch elements Qx, Qy, Qz of the lower arms of the power conversion circuit 6 and short-circuiting the three-phase armature coils Lu, Lv, Lw, in which a short circuit current Iu is flowing from the U-phase armature coil Lu towards the power conversion circuit 6. In this state, the current Iu flowing out of the U-phase armature coil Lu flows through the switch element Qx into the ground side, after which the current is diverted to the feedback diodes Dy, Dz, a current Iv flowing through the feedback diode Dy into the V-phase armature coil Lv, and a current Iw flowing through the feedback diode Dz into the W-phase armature coil Lw.

When, in this state, the switch element Qx through which the short circuit current Iu flows is turned OFF, and a half-wave rectified single-phase AC current Iu' is channeled towards the control power source circuit, an elevated voltage is generated in the armature coil Lu when the short circuit current Iu is cut off. Because this voltage appears between the DC terminals of the power conversion circuit 6, if the cutoff value of the short circuit current Iu is high, there is the risk of an excessive voltage being generated between the DC terminals when switching the armature coil short circuit control from three-phase short circuit control to two-phase short circuit control.

In order to prevent the occurrence of the problem described above, the timing at which one of the three switch elements short-circuiting the three-phase armature coils is turned OFF in order to switch the armature coil short circuit control from three-phase short circuit control to two-phase short circuit control in excessive voltage protection control is preferably set so as to fall within the period in which a forward current is flowing through the feedback diode connected in antiparallel to the switch element to be turned off.

In other words, two-phase short circuit control is preferably performed by turning off the switch element connected in parallel to the feedback diode through which the forward current is flowing when the voltage across the DC terminals of the power conversion circuit decreases to the low voltage benchmark value.

FIG. 5 illustrates a process of simultaneously turning ON the switch elements Qx, Qy, Qz of the lower arms of the power conversion circuit 6 and short-circuiting the three-phase armature coils Lu, Lv, Lw when the DC power source 3 is disconnected from the power conversion circuit 6 while the rotary electrical machine is being operated as a power generator, in which a short circuit current Iv is flowing from the V-phase armature coil Lv towards the power conversion circuit 6. In this state, the current Iv flowing out of the V-phase armature coil Lv flows through the switch element Qy into the ground side, after which the current is diverted to the feedback diodes Dx, Dz, a current Iw flowing through the feedback diode Dz into the W-phase armature coil Lw at the same time that a current Iu flows through the feedback diode Dx into the U-phase armature coil Lu.

Figure 8:
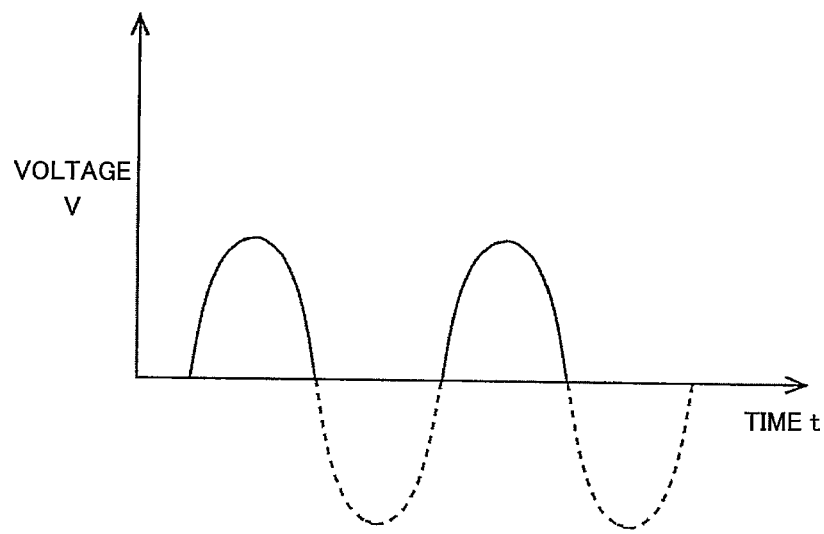
FIG. 8 is a waveform diagram of a waveform prior to smoothing of a voltage appearing between the DC terminals of the power conversion circuit when two armature phase coils are short-circuited.

In this state, when the switch element Qx connected in parallel to the feedback diode Dx through which the forward current Iu is flowing is turned OFF, there is no chance of the current being cut off when the switch element Qx is turned off, making it possible to short-circuit only two armature phase coils without inducing an elevated voltage in the armature coils. After the switch element Qx is switched off and a current u has begun to flow from the U-phase armature coil Lu towards the power conversion circuit, the current flows through the feedback diode Du towards the smoothing capacitor 8. As shown in FIG. 8, the voltage applied to the smoothing capacitor 8 at this time is a half-wave rectified single-phase AC voltage.

In the present embodiment, as described above, three-phase short circuit control, in which three-phase armature coils are short-circuited, is performed when the voltage across the DC terminals reaches the excessive voltage benchmark value, after which the armature coil short circuit control is switched to two-phase short circuit control, in which only two armature phase coils are short-circuited, and a voltage equal to or greater than the minimum value of the voltage range necessary to operate the controller 7 is outputted from the armature coil for one phase. Thus, while excessive voltage protection control is being performed, the control power source circuit 12 maintains a state of outputting power source voltage for operating the controller 7, and the excessive voltage protection operation can be performed without obstruction, allowing for circuits connected between the DC terminals of the power conversion circuit to be reliably protected from excessive voltage.

It is, of course, also acceptable to adopt a configuration in which, in the state illustrated in FIG. 5, the switch element Qz connected in parallel to the feedback diode Dw through which the short circuit current 1w is flowing as a forward current is turned off, thereby switching the armature coil short circuit control from three-phase short circuit control to two-phase short circuit control.

The timing at which armature coil short circuit control is switched from three-phase short circuit control to two-phase short circuit control can be detected from the position detection signal generated by the rotational position detector 5.

In the embodiment described above, if the rotational speed of the rotary electrical machine decreases with the DC power source 3 in a disconnected state, it will eventually become impossible to ensure a power source for the control system, and protective control (two-phase short circuit control) will be released. In order to prevent protective control from being released at an unexpected timing, the controller 7 is preferably configured so that three-phase short circuit control and two-phase short circuit control are ended when the rotational speed of the rotary electrical machine 2 becomes equal to or less than a safety speed. The safety speed is set to a rotational speed such that the unloaded induced voltage of the rotary electrical machine has a voltage value that will not damage equipment; for example, 1,000 r/min. The rotational speed of the rotary electrical machine 2 can be detected, for example, from the frequency of the position detection signal outputted by the rotational position detector 5.

In order to perform the various types of control described above, when the rotary electrical machine is being operated as a motor, the control voltage calculation means 16C shown in FIG. 3 finds the d axis current component and the q axis current component on the basis of the specified torque and the rotational speed, and finds the d axis drive voltage and the q axis drive voltage matching these current components.

The second coordinate conversion means 16D performs coordinate conversion upon the d axis drive voltage and q axis drive voltage calculated by the control voltage calculation means 16C according to rotational position, and finds the drive voltages (specified values) for each of phases U, V, W.

The drive pattern formation means 19 calculates the PWM duty for the legs of each of phases U, V, W on the basis of the U-phase drive voltage, V-phase drive voltage, and W-phase drive voltage received from the second coordinate conversion means 16D, and modifies the ON command signals commanding the switch elements of the upper arms of the power conversion circuit 6 to be turned on or the ON command signals commanding the switch elements of the lower arms of the power conversion circuit 6 to be turned on so as to have a waveform interrupted according to the calculated PWM duty. PWM control of the drive current sent to the rotary electrical machine 2 is thereby performed according to the specified motor output torque value, and the specified torque is outputted from the rotary electrical machine 2.

In order to perform control so that the voltage detected by the power source voltage detection circuit matches the set charging voltage when the rotary electrical machine 2 is being driven by the internal combustion engine and operated as a power generator, the control voltage calculation means 16C performs feedback control so that the d axis current is shifted to a magnetizing direction when the power generation voltage is insufficient, and the d axis current is shifted to a de-magnetizing direction when the power generation voltage is excessive.

The drive pattern formation means 19 forms a drive pattern for the switch elements of the power conversion circuit 6 such that, when the excessive voltage-determining means 17 detects that the voltage across the DC terminals of the power conversion circuit 6 has reached the excessive voltage benchmark value, three-phase short circuit control is performed, in which drive signals having a 100% ON duty are simultaneously sent to all the switch elements of the upper arms of the power conversion circuit 6 or drive signals having a 100% ON duty are simultaneously sent to all the switch elements of the lower arms of the power conversion circuit 6, thereby simultaneously turning on all the switch elements of the upper arms or all the switch elements of the lower arms and short-circuiting the three-phase armature coils; after which, when the power source voltage detected by the power source voltage detection circuit 9 decreases to a low voltage benchmark value set lower than the excessive voltage benchmark value and equal to or greater than the minimum value of the voltage range necessary to maintain the power source voltage of the controller 7, two-phase short circuit control is performed, in which one of the three switch elements short-circuiting the three-phase armature coils of the rotary electrical machine is turned off and only two armature phase coils are short-circuited. The drive pattern formation means 19 then sends ON command signals to the switch drive circuit 701 on the basis of the formed drive pattern.

In the present embodiment, the drive pattern formation means 19 constitutes an excessive voltage protection control means. The excessive voltage protection control means controls the switch elements of the power conversion circuit 6 so that, when the excessive voltage-determining means 17 determines that the voltage across the DC terminals 6a, 6b is in a state of excessive voltage, three-phase short circuit control is performed, in which either the three switch elements Qu, Qv, Qw of the upper arms or the three switch elements Qx, Qy, Qz of the lower arms of the power conversion circuit 6 are simultaneously turned on, and the three-phase armature coils are short-circuited; and, when the low voltage-determining means 18 determines that the voltage across the DC terminals 6a, 6b is in a state of lower voltage, two-phase short circuit control is performed, in which one of the three switch elements short-circuiting the three-phase armature coils of the rotary electrical machine is turned off and only two armature phase coils are short-circuited.

As described above, the microprocessor 700 of the controller 7 used in the present embodiment executes a program for controlling the switch elements of the power conversion circuit so that, when the value of the voltage across the DC terminals 6a, 6b of the power conversion circuit 6 is equal to or greater than the set excessive voltage benchmark value, three-phase short circuit control is performed, in which either the three switch elements Qu, Qv, Qw of the upper arms or the three switch elements Qx, Qy, Qz of the lower arms of the power conversion circuit 6 are simultaneously turned on, thereby short-circuiting three-phase armature coils; and, when the value of the voltage across the DC terminals of the power conversion circuit 6 decreases to the low voltage benchmark value set lower than the excessive voltage benchmark value and equal to or greater than the minimum value of the voltage range necessary to maintain the power source voltage of the controller, two-phase short circuit control is performed, in which one of the three switch elements short-circuiting the three-phase armature coils of the rotary electrical machine is turned off and only two armature phase coils are short-circuited.

In other words, the controller 7 used in the present embodiment is provided with excessive voltage-determining means 17 for determining that the voltage across the DC terminals is in a state of excessive voltage when the value of the voltage across the DC terminals of the power conversion circuit 6 is equal to or greater than the excessive voltage benchmark value; low voltage-determining means 18 for determining that the voltage across the DC terminals is in a state of low voltage when the value of the voltage across the DC terminals of the power conversion circuit 6 decreases to the low voltage benchmark value set lower than the excessive voltage benchmark value and equal to or greater than minimum value of the voltage range necessary to maintain the power source voltage of the controller; and excessive voltage protection control means for controlling the switch elements of the power conversion circuit so that, when the excessive voltage-determining means determines that the voltage across the DC terminals is in a state of excessive voltage, three-phase short circuit control is performed, in which either the three switch elements of the upper arms or the three switch elements of the lower arms of the power conversion circuit are simultaneously turned on, thereby short-circuiting the three-phase armature coils, and, when the low voltage-determining means determines that the voltage across the DC terminals is in a state of low voltage, two-phase short circuit control is performed, in which one of the three switch elements short-circuiting the three-phase armature coils of the rotary electrical machine is turned off and only two armature phase coils are short-circuited.

Figure 6:
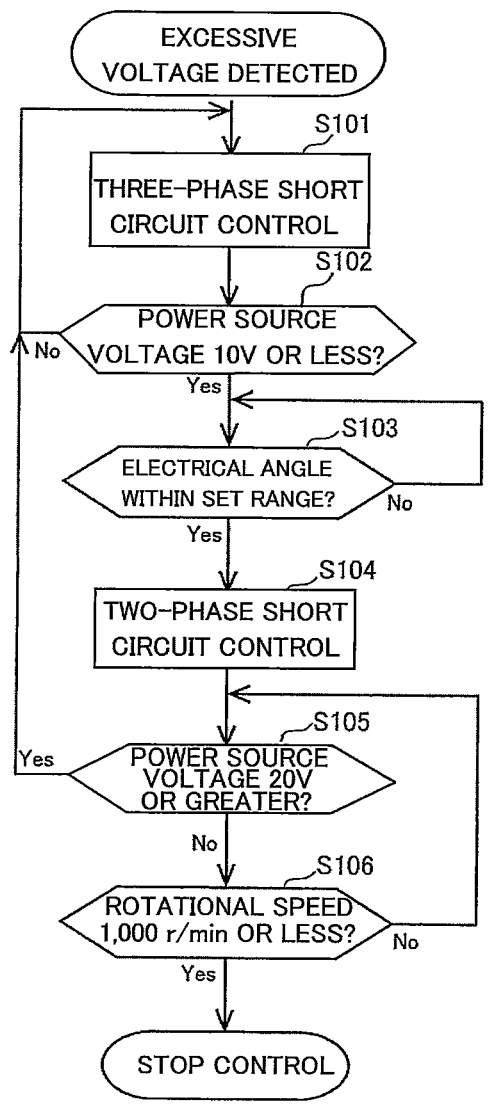
FIG. 6 is a flow chart showing one example of an algorithm for a process executed by the microprocessor in the control device of the present invention when an excessive voltage is detected.

FIG. 6 shows a flow chart for an algorithm of a process performed by the microprocessor 700 when the voltage across the DC terminals of the power conversion circuit 6 is determined to have reached the excessive voltage benchmark value. The process shown in FIG. 6 is begun when, while the rotary electrical machine is being operated as a power generator, the excessive voltage-determining means 17 first determines that the voltage across the DC terminals of the power conversion circuit 6 has reached the excessive voltage benchmark value.

When the process shown in FIG. 6 is begun, three-phase short circuit control, in which drive signals are simultaneously sent to all of the three switch elements Qx, Qy, Qz of the lower arms of the power conversion circuit 6, or drive signals are simultaneously sent to all of the three switch elements Qu, Qv, Qw of the upper arms of the power conversion circuit 6, thereby short-circuiting the three-phase armature coils, is performed in step S101.

The process then proceeds to step S102, in which it is determined whether the voltage across the DC terminals 6a, 6b (power source voltage) is equal to or less than the low voltage benchmark value (10 V in the present embodiment). If it is determined, as a result, that the power source voltage has not decreased to the low voltage benchmark value, the process returns to step S101 and waits for the power source voltage to decrease to the low voltage benchmark value.

When the power source voltage is determined, in step S102, to have decreased to the low voltage benchmark value, the process transitions to step S103, and it is determined whether or not the electrical angle of the drive current of the rotary electrical machine is within a set range (i.e., within a period in which a forward current is flowing through the feedback diode connected in parallel to the switch element to be turned off). If it is determined, as a result, that the electrical angle of the drive current of the rotary electrical machine is not within the set range, the process waits until the electrical angle of the drive current enters the set range. When it is determined, in step S103, that the electrical angle of the drive current is within the set range, i.e., that a forward current is flowing through the feedback diode connected in parallel to the switch element to be turned off, the process transitions to step S104, the supply of drive signals to the one switch element, out of the three switch elements that had been short-circuiting the three-phase armature coils Lu-Lw, that is connected in parallel to the feedback diode through which the forward current is flowing is stopped, and the switch element is turned off, thereby releasing the short circuit of the armature coil for one phase, and switching the armature coil short circuit control to two-phase short circuit control.

Next, in step S105, it is determined whether the voltage across the DC terminals 6a, 6b (the power source voltage) is equal to or greater than the excessive voltage benchmark value (20 V). If it is determined, as a result, that the power source voltage is equal to or greater than the excessive voltage benchmark value, the process returns to step S101. If it is determined that the power source voltage is less than the excessive voltage benchmark value, the process transitions to step S106. In step S106, it is determined whether or not the rotational speed of the rotary electrical machine is equal to or less than the safety speed (1,000 r/min); if the rotational speed exceeds the safety speed (1,000 r/min), the process returns to step S105. If it is determined in step S106 that the rotational speed of the rotary electrical machine is equal to or less than the safety speed (1,000 r/min), the supply of drive signals to the switch elements of the power conversion circuit is stopped, and excessive voltage protection control ceases.

In the embodiment described above, it is preferable for reasons of safety to adopt a configuration in which the rotational speed of the rotary electrical machine is reduced to no more than the safety speed, at which the voltage value is such that there is no risk of the unloaded induced voltage of the rotary electrical machine damaging devices connected between the DC terminals, when the DC power source is disconnected from the power conversion circuit. It is therefore preferable to provide a control device for performing control so as to either reduce the rotational speed of the rotary electrical machine to the safety speed or stop the rotary electrical machine when the DC power source is disconnected from the power conversion circuit.

A rotary electrical machine 2 such as that described above will often have the rotor thereof attached to the crankshaft of the internal combustion engine 1, and will be operated as an internal combustion engine-starting motor when the internal combustion engine is being started, and as an AC power generator for charging a battery after the engine has started. In such cases, the internal combustion engine control device (not shown) provided on the internal combustion engine is preferably configured to perform control so that either the rotational speed of the internal combustion engine 1 is reduced to no more than the safety speed or the internal combustion engine 1 is stopped when it is detected that the battery has been disconnected from the power conversion circuit.

Control involving reducing the rotational speed of the internal combustion engine can be performed, for example, by retarding the engine ignition timing when battery disconnection has been detected. Control involving stopping the internal combustion engine can be performed, for example, by causing the internal combustion engine to misfire, stopping the supply of fuel to the internal combustion engine, or turning off the contact for the relay supplying power to the internal combustion engine control device or ignition device when battery disconnection is detected.

Battery disconnection detection may be performed on the side of the internal combustion engine control device or on the side of the controller 7 controlling the rotary electrical machine. On the side of the rotary electrical machine controlling the rotary electrical machine, battery disconnections can be detected from the value of the voltage across the DC terminals of the power conversion circuit 6 reaching the excessive voltage benchmark value. If a detection means for detecting battery disconnections is provided on the controller side, a stop command is issued to the internal combustion engine control device when the detection means detects a battery disconnection, causing the internal combustion engine control device to perform a process to stop the engine.

In the embodiment described above, control of the rotary electrical machine is performed via vector control, but the present invention is not limited to vector control.

In the embodiment described above, the various means shown in FIG. 3 are constituted by a microprocessor, but the various means may also be constituted by a logic circuit.

INDUSTRIAL APPLICABILITY

In accordance with the present invention, in cases in which a power conversion circuit is provided between a permanent magnet-type rotary electrical machine and a DC power source constituted by an energy storage device such as a battery, and the power conversion circuit is controlled so as to impart the rotary electrical machine with a motor function and a power generator function for charging a DC power source, it is possible to reliably prevent excessive voltage from being generated when the excessive voltage, thereby increasing the reliability of the permanent magnet-type rotary electrical machine and heightening its usefulness.

What is claimed is:
1. A control device for controlling a rotary electrical machine provided with a rotor, the magnetic field of which is formed by a permanent magnet, and a stator having three- phase armature coils; the machine being made to operate as an AC power generator or a motor; the device comprising:
- a power conversion circuit comprising a three-phase full bridge circuit in which individual arms are provided with a switch element and a feedback diode connected in antiparallel to the switch element, the power conversion circuit having a pair of DC terminals connected across the output of a DC power source and three-phase AC terminals connected to three-phase outputs of the armature coils, respectively;
- a smoothing capacitor connected across the DC terminals of the power conversion circuit; and
- a controller driven by a power source voltage which is control DC voltage obtained from the voltage across the DC terminals of the power conversion circuit, the controller controlling the switch elements of the power conversion circuit so that, when the rotary electrical machine is operated as a motor, the power conversion circuit is made to function as an inverter and an armature current is supplied from the DC power source to the rotary electrical machine; and, when the rotary electrical machine is operated as an AC power generator, the power conversion circuit is made to function as a rectifier and a charging current is supplied from the armature coil to the DC power source;
- the controller being configured so that, when the voltage across the DC terminals of the power conversion circuit is equal to or greater than a set excessive voltage benchmark value, three-phase short circuit control is performed, in which either the three switch elements of the upper arms or the three switch elements of the lower arms of the power conversion circuit are simultaneously turned on, thereby short-circuiting the three-phase armature coils; and, when the value of the voltage across the DC terminals of the power conversion circuit decreases to a low voltage benchmark value set lower than the excessive voltage benchmark value and equal to or greater than the minimum value of a voltage range necessary to maintain the power source voltage of the controller, two-phase short circuit control is performed, in which one of the three switch elements short-circuiting the three-phase armature coils is turned off, and only two armature phase coils are short-circuited.

2. The control device for controlling the rotary electrical machine according to claim 1, wherein the timing at which one of the three switch elements short-circuiting the three-phase armature coils is turned off when two-phase short circuit control is being performed is set so as to fall within a period in which a forward current is flowing through the feedback diode connected in antiparallel to the switch element to be turned off.

3. The control device for controlling the rotary electrical machine according to claim 1, wherein two-phase short circuit control is performed by turning off the switch element connected in parallel to the feedback diode through which the forward current is flowing when the voltage across the DC terminals of the power conversion circuit decreases to the low voltage benchmark value.

4. The control device for controlling the rotary electrical machine according to claim 1, further provided with a control device for reducing the rotational speed of the rotary electrical machine or stopping the rotary electrical machine when the voltage across the DC terminals of the power conversion circuit is equal to or greater than the excessive voltage benchmark value when the rotary electrical machine is being operated as an AC power generator;
- the controller being configured so as to end three-phase short circuit control and two-phase short circuit control when the rotational speed of the rotary electrical machine becomes equal to or less than a set safety speed.

5. The control device for controlling the rotary electrical machine according to claim 2, further provided with a control device for reducing the rotational speed of the rotary electrical machine or stopping the rotary electrical machine when the voltage across the DC terminals of the power conversion circuit is equal to or greater than the excessive voltage benchmark value when the rotary electrical machine is being operated as an AC power generator;
- the controller being configured so as to end three-phase short circuit control and two-phase short circuit control when the rotational speed of the rotary electrical machine becomes equal to or less than a set safety speed.

6. The control device for controlling the rotary electrical machine according to claim 3, further provided with a control device for reducing the rotational speed of the rotary electrical machine or stopping the rotary electrical machine when the voltage across the DC terminals of the power conversion circuit is equal to or greater than the excessive voltage benchmark value when the rotary electrical machine is being operated as an AC power generator;
- the controller being configured so as to end three-phase short circuit control and two-phase short circuit control when the rotational speed of the rotary electrical machine becomes equal to or less than a set safety speed.

* * * * *